United States Patent [19]

Obama et al.

[11] Patent Number: 5,124,383

[45] Date of Patent: Jun. 23, 1992

[54] CLEANING RESIN COMPOSITION

[75] Inventors: Kenjiro Obama; Hiroshi Takasu; Susumu Arase; Hiroyuki Fujii, all of Ichiharashi, Japan

[73] Assignee: Chisso, Japan

[21] Appl. No.: 707,751

[22] Filed: May 30, 1991

Related U.S. Application Data

[60] Division of Ser. No. 521,549, May 10, 1990.

[30] Foreign Application Priority Data

May 22, 1989 [JP] Japan ................... 1-128428
Jun. 20, 1989 [JP] Japan ................... 1-157490

[51] Int. Cl.$^5$ ............... C11D 1/22; C11D 3/37
[52] U.S. Cl. ................. 524/115; 252/174.24; 252/174.25; 252/554; 252/558; 524/261; 524/400; 524/585; 524/586; 524/392
[58] Field of Search ............ 252/554, 558, 174.24, 252/174.25; 524/115, 586, 585, 261, 400

[56] References Cited

U.S. PATENT DOCUMENTS 4,838,945  6/1989  Fuji et al. ................... 252/174
4,838,948  6/1989  Bailey ........................ 134/7

FOREIGN PATENT DOCUMENTS 0234529   9/1987  European Pat. Off. .
0346956  12/1989  European Pat. Off. .

*Primary Examiner*—Morton Foelak
*Attorney, Agent, or Firm*—Leydig, Voit & Mayer

[57] ABSTRACT

A resin composition for cleaning the inside of molding machines, capable of easily achieving color exchange and the resin exchange of thermoplastic resins in various molding machines, in a small quantity, by a simple operation and in a short time is provided, which resin composition is a cleaning resin composition having 1-10 wt. % of a polyethylene wax, 1-20 wt. % of a neutral salt of an alkylbenzenesulfonic acid and 1-20 wt. % of an inorganic filler, blended with a high density polyethylene resin having a melt index of 1.0 or less and a Q value expressing a molecular weight distribution, of 10 or less.

8 Claims, No Drawings

CLEANING RESIN COMPOSITION

RELATED APPLICATIONS

This application is a divisional application of Ser. No. 07/521,549, filed May 10, 1990.

BACKGROUND OF THE INVENTION

1. Field of the Invention

This invention relates to a cleaning resin composition used for cleaning the inside of various molding machines.

More particularly it relates to a cleaning resin composition having definite quantities of a polystyrene resin, a neutral salt of an alkylbenzenesulfonic acid, an inorganic filler and a water-repellent compound, blended with a high density polyethylene resin having a high viscoelasticity when melted and a narrow molecular weight distribution, and a cleaning resin composition having a low molecular weight polyethylene wax, a neutral salt of an alkylbenzenesulfonic acid and an inorganic filler, blended with a high density polyethylene resin having a high viscoelasticity when melted and a narrow molecular weight distribution.

2. Description of the Related Art

In the field of mold processing of plastics, production of more grades in smaller quantities has been intended. Further, due to the creation of high-performance engineering plastics, the frequency of color exchange or resin exchange inside molding machines has rapidly increased Heretofore, at the time of such color exchange or resin exchange, in order to remove contaminants caused by the preceding resin inside the molding machine, the following processes have been employed:

a process of drawing out the contaminated screw inside the molding machine, followed by brushing the screw or the inner wall of the cylinder to thereby clean them, or a process of flowing a colorless resin as a cleaning resin through the inside of the cylinder to clean the screw together with the cylinder, without drawing out the screw.

However, both of these processes require a long time to completely clean the screw and the inside of the molding machine, and in the case of co-cleaning, a large quantity of cleaning resin is required resulting in a large loss in economical and time aspects.

Thus, in order to solve such problems, various cleaning agents for cleaning the inside of molding machines have been developed.

For example, a cleaning agent composed mainly of an acrylic resin, a cleaning agent obtained by blending a surfactant with a thermoplastic resin (Japanese patent application laid-open No. Sho 59-124999), a cleaning agent obtained by blending a surfactant and a lubricant such as a metal salt of stearic acid with a thermoplastic resin (Japanese patent application laid-open No. Sho 58-149998) and a composition obtained by blending a sodium alkylbenzenesulfonate, talc, zinc stearate, etc. with a linear, low density polyethylene (Japanese patent application laid-open No. Sho 60-139411) have been proposed.

However, in the case of the cleaning agent composed mainly of an acrylic resin, since the acrylic resin has a high melt viscosity, a high load is applied to the molding machine at the time of cleaning and also when the temperature inside the molding machine is raised in order to lower the melt viscosity, there is a drawback that the acrylic resin is susceptible to thermal decomposition.

Further, there are drawbacks that operations are troublesome and time consuming. For example, before the cleaning agent is used, the die, metal gauze, etc. of the molding machine have to be removed, and further if the cleaning agent remains inside the molding machine after completion of the cleaning, the remaining cleaning agent mixes in the succeeding molded product so that the agent in the form of foreign matter deteriorates the appearance or the physical properties of the molded product.

Further, in the cases of a cleaning agent obtained by blending a surfactant with a thermoplastic resin and a cleaning agent obtained by further blending a metal stearate, etc. therewith, when the service temperature of these cleaning agents reaches about 250° C. or higher, a gas is generated from decomposition of the cleaning agents so that it has a bad effect upon the operational environment and at the same time, the cleaning effect of the cleaning agent is still insufficient. Further, in the case of the cleaning agent obtained by blending a sodium alkylbenzenesulfonate, talc, etc. with a linear low density polyethylene, since the agent has a low viscoelasticity when melted inside the molding machine, the capability of removing the preceding resin i.e. a cleanability is low, and in the case where the quantity of the inorganic filler blended is large, the cleaning agent itself is liable to remain on the inside wall of the molding machine so that in order to remove the remaining cleaning agent, a large quantity of the cleaning resin has to be used.

Further, the present inventors have previously proposed a thermoplastic resin composition obtained by blending a neutral salt of an alkylbenzenesulfonic acid and a water-repellent compound with a thermoplastic resin (Japanese patent application laid-open No. Sho 62-195045), but a cleaning agent having a further superior cleanability has been desired.

SUMMARY OF THE INVENTION

The present inventors have conducted extensive research in order to obtain a resin composition for cleaning the insides of molding machines, capable of easily achieving the color exchange and the resin exchange of thermoplastic resins in various molding machines, using small quantity of the cleaning resin composition, by a simple operation and in a short time.

As a result, we have found that a composition obtained by blending small quantities of a polystyrene resin, a neutral salt of an alkylbenzenesulfonic acid, an inorganic filler and a water-repellent compound with a high density polyethylene resin having a high viscoelasticity when melted and a narrow molecular weight distribution, and a composition obtained by blending a low molecular weight polyethylene wax, a neutral salt of an alkylbenzenesulfonic acid the alkyl group of which has 10 to 18 carbon atoms and an inorganic filler with a high density polyethylene resin having a high viscoelasticity when melted and a narrow molecular weight distribution are each a cleaning resin composition exhibiting a notably improved cleaning effect, and have completed the present invention based upon the above finding.

The present invention includes the following compositions (1) and (2) in the first aspect and (3) and (4) in the second aspect:

(1) A cleaning resin composition having 1 to 10% by weight of a polystyrene resin, 1 to 20% by weight of a neutral salt of an alkylbenzenesulfonic acid, 1 to 30% by weight of an inorganic filler and 0.5 to 10% by weight of a water-repellent compound, blended with a high density polyethylene resin having a melt index of 1.0 or less and a Q value expressing a molecular weight distribution, of 10 or less, the total % by weight of the composition being 100.

(2) A cleaning resin composition according to item (1) which is further melt-kneaded and molded into a pellet form.

(3) A cleaning resin composition having 1 to 10% by weight of a polyethylene wax, 1 to 20% by weight of a neutral salt of an alkylbenzenesulfonic acid in which the alkyl group has 10 to 18 carbon atoms and 1 to 20% by weight of an inorganic filler, with a high density polyethylene resin having a melt index of 1.0 or less and a Q value expressing a molecular weight distribution, of 10 or less, the total % by weight of the composition being 100.

(4) A cleaning resin composition according to item (3) which is further melt-kneaded and molded into a pellet form.

DETAILED DESCRIPTION OF PREFERRED EMBODIMENTS

As the high density polyethylene resin used in the present invention, an ethylene homopolymer, copolymers of ethylene with propylene, butene-1, hexene-1, etc. and the like, each having a melt index of 1.0 or less and a Q value expressing a molecular weight distribution, of 10 or less, preferably 8 or less are mentioned.

The Q value referred to herein means a numeral value obtained by measuring the number average molecular weight (Mn) and the weight average molecular weight (Mw) employing gel permeation chromatography (GPC) in a conventional manner and expressed in terms of $Q = Mw/Mn$.

If the melt index of the high density polyethylene resin exceeds 1, the melt fluidity of the resulting cleaning resin composition inside the molding machine is too high when the inside of the molding machine is cleaned with the cleaning resin composition, so that the capability of cleaning the preceding resin remaining inside the molding machine, i.e. cleanability is reduced. On the other hand, if a high density polyethylene resin having a broad molecular weight distribution (Q value: higher than 10) is used, the viscoelasticity of the resulting cleaning resin composition when melted is low when the inside of the molding machine is cleaned with the cleaning resin composition so that the cleanability is reduced. As the polystyrene resin used in the present invention, commercially available, conventional polystyrene resin or high-impact polystyrene resin may be used, and the quantity of the polystyrene resin blended is 1 to 10% by weight based on the weight of the composition. If the blended quantity is less than 1% by weight, the effect of cleaning the inside of the molding machine is small, while if it exceeds 10% by weight, the compatibility of the resin with the high density polyethylene is inferior so that when a pellet form composition is produced, it is impossible due to grinding, etc. to obtain a pellet form cleaning resin composition in a uniform form.

The molecular weight of the polyethylene wax used in the present invention has no particular limitation, but the molecular weight is preferably 1,000 to 10,000. Further, the quantity of the polyethylene wax blended is preferably 1 to 10% by weight. If the blended quantity is less than 1% by weight, the lubricating properties of the cleaning resin composition inside the molding machine are reduced so that it is difficult to remove the remaining resin by the succeeding cleaning resin, while if it exceeds 10% by to the contrary, the lubricating properties are too enhanced so that the cleanability is reduced.

As the neutral salt of an alkylbenzenesulfonic acid used in the present invention, Na salt, Ca salt, Mg salt, K salt, etc. of an alkylbenzenesulfonic acid in which the alkyl group has 6 to 20 carbon atoms, preferably 10 to 18 carbon atoms, are mentioned. The quantity of the neutral salt of an alkylbenzenesulfonic acid blended is 1 to 20% by weight, preferably 5 to 15% by weight. If the blended quantity is less than 1% by weight, the cleanability inside the molding machine is not exhibited, while if it exceeds 20% by weight, the neutral salt of an alkylbenzenesulfonic acid remains inside the molding machine and the melt fluidity of the cleaning resin composition at the time of cleaning is inferior, so that it is necessary to apply a high load to the molding machine.

As the inorganic filler used in the present invention, inorganic fillers usually blended with polyolefin resins e.g., $MgCO_3$, $CaCO_3$, talc, $CaSO_4$, magnesium silicate, silica, alumina, etc. may be used. The inorganic filler contained in the cleaning resin composition exerts a function of scraping off dirt inside the molding machine and the preceding resin adhered to the machine by mechanical force. The quantity of the inorganic filler blended is 1 to 30% by weight, preferably 5 to 20% by weight based on the weight of the composition in the case of the first aspect of the present invention. If the blended quantity is less than 1% by weight, the cleaning effect is insufficient, while if it exceeds 30% by weight, the melt fluidity of the cleaning resin composition is reduced so that too high d load is applied to the molding machine at the time of cleaning. Further, in the case of the second aspect of the present invention, the quantity of the inorganic filler blended is 1 to 20% by weight, preferably 3 to 15% by weight. If the blended quantity is less than 1% by weight, the cleanability is insufficient, while if it exceeds 20% by weight to the contrary, the melt fluidity of the cleaning resin composition is reduced; hence too a high load is applied to the molding machine at the time of cleaning or the cleaning resin composition remains inside the molding machine to make the substitution of the composition by the succeeding cleaning resin difficult.

As the water-repellent compound used in the present invention, synthetic waxes such as polyethylene wax, etc., silicone, wax, metal salts of higher fatty acids such as calcium stearate, zinc stearate, lead stearate, etc., and mixtures of two or more kinds of the foregoing may be mentioned. The quantity of the water-repellent compound blended is 0.5 to 10% by weight, preferably 2 to 10% by weight. The water-repellent compound contained in the cleaning resin composition of the present invention exerts a lubricating function. If the quantity of the water-repellent compound blended is less than 0.5% by weight, its lubricating effect is small, while if it exceeds 10% by weight, the lubricating properties are too enhanced, so that the mechanical force of the coexisting inorganic filler inside the molding machine is reduced, resulting in reduction of the cleanability.

Besides, in the cleaning resin composition in the second aspect of the present invention, it is possible, if desired, to use a water-repellent compound such as waxes e.g. polypropylene wax, carnauba wax, etc., silicone, paraffin wax, metal salts of higher fatty acids e.g. calcium stearate, magnesium stearate, etc.

In the compositions of the present invention, antioxidants, usually blended with polyolefin resins, such as phenolic antioxidants, thio antioxidants, phosphorus antioxidants, etc., may be blended.

Besides, in the compositions of the present invention, it is possible, if desired, to blend a surfactant such as sodium alkyl ether sulfate esters in which the alkyl group has 6 to 20 carbon atoms, sodium α-olefinsulfonate, fatty acid alkanol amides, sulfonic acid chloride, etc.

The composition in the first aspect of the present invention is obtained by feeding definite quantities of a high density polyethylene resin having a melt index of 1.0 or less and a Q value of 10 or less, a polystyrene resin, a neutral salt of an alkylbenzenesulfonic acid, an inorganic filler and a water-repellent compound and at least one of the above-mentioned antioxidants into an agitating and mixing apparatus such as a Henschel mixer (tradename), supermixer, etc., and mixing them with stirring for 1 to 5 minutes, and it is also possible to obtain the composition in the form of pellets by extruding the above mixture by means of a single-screw extruder or a twin-screw extruder at a melt-kneading temperature of 180° to 230° C.

The cleaning resin composition in the second aspect of the present invention is obtained by feeding definite quantities of a high density polyethylene having a melt index of 1.0 or less and a Q value of 10 or less, a polyethylene wax, a neutral salt of an alkylbenzenesulfonic acid in which the alkyl group has 10 to 18 carbon atoms and an inorganic filler into an agitating and mixing apparatus such as a Henschel mixer (tradename) and mixing them with stirring for 1 to 5 minutes, and it is also possible to obtain the composition in the form of pellets by melt-kneading the above mixture at a melt-kneading temperature of 180° to 230° C., by means of a single-screw or twin-screw extruder.

The present invention will be described in more detail by way of examples and comparative examples, but it should not be construed to be limited thereto.

(1) The cleanability test in examples and comparative examples was carried out according to the following method:

Black pellets of acrylonitrile-butadiene-styrene resin (ABS resin) containing 1% by weight of carbon black or black pellets of modified polyphenylene oxide were injection-molded by means of a 35 tons injection molding machine in 15 shots, followed by injection-molding the respective cleaning resin compositions obtained in examples and comparative examples, each in 100 g, to thereby clean the inside of the molding machine, repeating the injection molding with the respective cleaning resins &ill the resulting molded products appeared colorless and determining the respective quantities of the cleaning resins required therefor and also measuring the respective cleaning times in which the molded products appeared colorless, as cleaning time .

(2) Measurement according to GPC was carried out under the following conditions:
Apparatus: GPC 150C manufactured by Waters Co., Ltd.
Column: TSK-GEL GMH 6-HT made by TOSOH CORPORATION
Solvent: ODCB (o-dichlorobenzene)
Temperature: 135° C.
Flow rate: 1.0 ml/min In addition, the Q value employed as a measure of molecular weight distribution is expressed by the following equation:

$$Q \text{ value} = \frac{Mw \text{ (weight average molecular weight)}}{Mn \text{ (number average molecular weight)}}$$

EXAMPLE 1

A high density polyethylene having a melt index (measured according to JIS K 6760) of 0.3, a Q value of 6.7 and a density of 0.945 (3.025 Kg), a polystyrene having a melt index (measured according to JIS K 6871) of 20 (0.40 Kg), magnesium dodecylbenzenesulfonate (0.25 Kg), calcium carbonate (1.25 Kg) and a polyethylene wax (number average molecular weight: 1,500)(0.075 Kg) were placed in a 20 ( capacity Henschel mixer (tradename), followed by mixing these with stirring at a revolution number of 500 rpm for 3 minutes, feeding the resulting mixture into a hopper of a single-screw extruder of 35 mm in cylinder diameter, extruding strands under conditions of a cylinder temperature of 200° C. and a die temperature of 190° C. and cutting the strands by means of a pelletizer to obtain a pellet-form composition. Next, a black ABS resin containing 1% by weight of carbon black was injection-molded by means of an injection molding machine heated to a cylinder temperature of 230° C. in 15 shots, followed by cleaning the inside of the molding machine with 100 g of the composition of the present invention (described immediately above), thereafter feeding an uncolored polypropylene resin (melt flow rate according to JIS K 6758: 20) as a cleaning resin into the molding machine, repeating injection molding to clean the inside of the molding machine and continuing this operation until the resulting molded product was not colored.

The quantity of the polypropylene resin required for the cleaning was 100 g, the number of shots was 5 and the cleaning time was 10 minutes.

EXAMPLE 2

Mixing and pelletizing were carried out in the same manner as in Example 1 except that a high density polyethylene having a melt index of 0.45, a Q value of 6.6 and a density of 0.945 was used, to obtain a cleaning resin composition. This composition was subjected to a cleanability test in the same manner as in Example 1. The quantity of the polypropylene resin used as the cleaning resin was 120 g, the number of shots was 6 and the cleaning time was 11 minutes.

EXAMPLE 3

Mixing and pelletizing were carried out in the same manner as in Example 1 except that a high density polyethylene having a melt index of 0.8, a Q value of 6.4 and a density of 0.945 was used, to obtain a cleaning resin composition. This composition was subjected to a cleanability test in the same manner as in Example 1. The quantity of the polypropylene resin used as a cleaning resin was 120 g, the number of shots was 6 and the cleaning time was 11 minutes.

EXAMPLE 4

A high density polyethylene having a melt index of 0.45, a Q value of 6.6 and a density of 0.945 (3.70 Kg), a polystyrene having a melt index of 20 (1.0 Kg), magnesium dodecylbenzenesulfonate (0.75 Kg), calcium carbonate (0.25 Kg) and a polyethylene wax 0.20 Kg) were mixed and pelletized in the same manner as in Example 1.

Next, a modified polyphenylene oxide containing 1% by weight of carbon black was injection-molded by means of an injection molding machine heated to a cylinder temperature of 300° C. in 15 shots, followed by injection-molding 100 g of the composition of the present invention to clean the inside of the molding machine and then carrying out a cleanability test in the same manner as in Example 1, using a polyethylene terephthalate (FRPET C3030 made by Teijin Ltd.) as a cleaning resin. The quantity of the polyethylene terephthalate used as a cleaning resin was 260 g, the number of shots was 13 and the cleaning time was 19 minutes.

COMPARATIVE EXAMPLE 1

Mixing and pelletizing were carried out in the same manner as in Example 1 except that a high density polyethylene having a melt index of 5.0, a Q value of 7.5 and a density of 0.945 (3.025 Kg) was used, to obtain a cleaning resin composition. This composition was subjected to a cleanability test in the same manner as in Example 1. The quantity of a polypropylene resin used as a cleaning resin was 400 g, the number of shots was 20 and the cleaning time was 25 minutes.

COMPARATIVE EXAMPLE 2

Mixing and pelletizing were carried out in the same manner as in Example 1 except that a high density polyethylene having a melt index of 0.30, a Q value of 15.7 and a density of 0.945 (3.025 Kg) was used, to obtain a cleaning resin composition. This composition was subjected to a cleanability test in the same manner as in Example 1. The quantity of a polypropylene resin used as a cleaning resin was 520 g, the number of shots was 26 and the cleaning time was 31 minutes.

COMPARATIVE EXAMPLE 3

Mixing and pelletizing were carried out in the same manner as in Example 1 except that a low density polyethylene (melt index: 58, a Q value: 8.7, a density: 0.927) (3.025 Kg) was used, to obtain a cleaning resin composition. This composition was subjected to a cleanability test in the same manner as in Example 1. The quantity of a polypropylene resin used as a cleaning resin was 500 g, the number of shots was 25 and the cleaning time was 30 minutes.

COMPARATIVE EXAMPLE 4

Mixing and pelletizing were carried out in the same manner as in Example 1 except that a high density polyethylene having a melt index of 0.80, a Q value of 6.4 and a density of 0.945 (3.425 Kg) was used and a polystyrene resin was not used, to obtain a cleaning resin composition. This composition was subjected to a cleanability test in the same manner as in Example 1. The quantity of a polypropylene resin used as a cleaning resin was 460 g, the number of shots was 23 and the cleaning time was 28 minutes.

COMPARATIVE EXAMPLE 5

Mixing and pelletizing were carried out in the same manner as in Example 1 except that a linear low density polyethylene (melt index: 1.5, Q value: 11.3, a density: 0.920) (2.1 Kg), magnesium dodecylbenzenesulfonate (0.20 Kg), calcium carbonate (2.50 Kg), sodium stearate (0.10 Kg) and zinc stearate (0.10 Kg) were used, to obtain a cleaning resin composition. This composition was subjected to a cleanability test in the same manner as in Example 1. The quantity of a polypropylene resin used as a cleaning resin was 460 g, the number of shots was 23 and the cleaning time was 28 minutes.

COMPARATIVE EXAMPLE 6

Mixing and pelletizing were carried out in the same manner as in Comparative example 5 except that a high density polyethylene (melt index: 5.0, Q value: 7.5 and density: 0.945) (2.1 Kg) was used, to obtain a cleaning resin composition. This composition was subjected to a cleanability test in the same manner as in Example 1. The quantity of a polypropylene resin used as a cleaning resin was 420 g, the number of shots was 21 and the cleaning time was 26 minutes.

COMPARATIVE EXAMPLE 7

Mixing and pelletizing were carried out in the same manner as in Example 1 except that a high density polyethylene (melt index: 5.0, Q value: 7.5 and density: 0.945) (1.90 Kg), calcium carbonate (2.50 g), liquid paraffin (0.50 Kg) and ethylenebishydroxystearic acid amide (0.10 Kg) were used, to obtain a cleaning resin composition. This composition was subjected to a cleanability test in the same manner as in Example 1. The quantity of a polypropylene resin used as a cleaning resin was 840 g, the number of shots was 42 and the cleaning time was 47 minutes.

The compositions and the cleanability test results of the respective compositions of Examples 1–4 and Comparative examples 1–7 are collectively shown in Table 1.

TABLE 1

| | Item | | | | Example | | | | Comparative example | | | | | | |
|---|---|---|---|---|---|---|---|---|---|---|---|---|---|---|---|
| | | | | | 1 | 2 | 3 | 4 | 1 | 2 | 3 | 4 | 5 | 6 | 7 |
| Composition (wt. %) | Polyethylene | Kind | MI | Q | | | | | | | | | | | |
| | | HDPE | 0.30 | 6.7 | 60.5 | — | — | — | — | — | — | — | — | — | — |
| | | HDPE | 0.45 | 6.6 | — | 60.5 | — | 74.0 | — | — | — | — | — | — | — |
| | | HDPE | 0.80 | 6.4 | — | — | 60.5 | — | — | — | — | 68.5 | — | — | — |
| | | HDPE | 5.00 | 7.5 | — | — | — | — | 60.5 | — | — | — | — | 42.0 | 38.0 |
| | | HDPE | 0.30 | 15.7 | — | — | — | — | — | 60.5 | — | — | — | — | — |
| | | LDPE | 5.80 | 8.7 | — | — | — | — | — | — | 60.5 | — | — | — | — |
| | | LLDPE | 1.50 | 11.3 | — | — | — | — | — | — | — | — | 4.20 | — | — |
| | Polystyrene | PS | 20 | | 8.0 | 8.0 | 8.0 | 2.0 | 8.0 | 8.0 | 8.0 | — | — | — | — |
| | Others | Mg alkylbenzenesulfonate | | | 5.0 | 5.0 | 5.0 | 15.0 | 5.0 | 5.0 | 5.0 | 5.0 | 4.0 | 4.0 | — |

TABLE 1-continued

|  | Item | Example 1 | Example 2 | Example 3 | Example 4 | Comparative example 1 | Comparative example 2 | Comparative example 3 | Comparative example 4 | Comparative example 5 | Comparative example 6 | Comparative example 7 |
|---|---|---|---|---|---|---|---|---|---|---|---|---|
|  | CaCO₃ | 25.0 | 25.0 | 25.0 | 5.0 | 25.0 | 25.0 | 25.0 | 25.0 | 50.0 | 50.0 | 50.0 |
|  | Polyethylene wax | 1.5 | 1.5 | 1.5 | 4.0 | 1.5 | 1.5 | 1.5 | 1.5 | — | — | — |
|  | Liquid paraffin | — | — | — | — | — | — | — | — | — | — | 10.0 |
|  | Ethylenebishydroxy-stearic acid amide | — | — | — | — | — | — | — | — | — | — | 2.0 |
|  | Na stearate | — | — | — | — | — | — | — | — | 2.0 | 2.0 | — |
|  | Zn stearate | — | — | — | — | — | — | — | — | 2.0 | 2.0 | — |
| Clean-ability test | Cylinder temp. (°C.) | 230 | 230 | 230 | 300 | 230 | 230 | 230 | 230 | 230 | 230 | 230 |
|  | Preceding resin (color) | ABS (black) | ABS (black) | ABS (black) | 300 modi-fied PPO (black) | ABS (black) | ABS (black) | ABS (black) | ABS (black) | ABS (black) | ABS (black) | ABS (black) |
|  | Cleaning resin | PP | PP | PP | PET | PP | PP | PP | PP | PP | PP | PP |
|  | Amount of cleaning resin used (g) | 100 | 120 | 120 | 260 | 400 | 520 | 500 | 360 | 460 | 840 | 420 |
|  | Number of shots | 5 | 6 | 6 | 13 | 20 | 26 | 25 | 18 | 23 | 42 | 21 |
|  | Cleaning time (min) | 10 | 11 | 11 | 19 | 25 | 31 | 25 | 23 | 28 | 47 | 26 |

EXAMPLE 5

A high density polyethylene (melt index (JIS K6760): 0.30, Q value: 6.7, density: 0.945) (3.45 Kg), magnesium dodecylbenzenesulfonate (0.75 Kg), CaCO₃ (0.50 Kg) and a polyethylene wax (number average molecular weight: 1,500) (0.30 Kg) were fed into a 20 l capacity Henschel mixer (tradename), followed by mixing these with stirring at a revolution number of 500 rpm for 3 minutes, feeding the resulting mixture into the hopper of a single-screw extruder of 35 mm in cylinder diameter, extruding strands under conditions of a cylinder temperature of 200° C. and a die temperature of 210° C. and cutting the strands by means of a pelletizer to obtain a granular cleaning resin composition.

Using this cleaning resin composition, an injection molding machine dirtied by an ABS resin containing 1% by weight of carbon black was subjected to a cleanability test. The cleaning resin composition (described immediately above)) was fed into the molding machine at a cylinder temperature of 230° C. to clean the inside of the molding machine, followed by carrying out a substitution cleaning of the inside of the molding machine with a polypropylene (PP) as a cleaning resin. The quantity of the PP required therefor was 80 g (4 shots) and the time required for the cleaning was 9 minutes.

EXAMPLE 6

A high density polyethylene (melt index: 0.30, Q value: 6.7, density: 0.945) (4.25 Kg), calcium dodecylbenzenesulfonate (0.40 Kg), silica (average particle diameter: 3.5μ or less) (0.20 Kg) and a polyethylene wax (number average molecular weight: 1,500) were mixed together under the same conditions as in Example 5, followed by pelletization to obtain a granular cleaning resin composition. Using this cleaning resin composition, an injection-molding machine dirtied by a black modified polyphenylene oxide (PPO) containing 1% by weight of carbon black was subjected to a cleanability test. The cleaning resin composition was then fed into the molding machine at a cylinder temperature of 300° C. to clean the inside of the molding machine, followed by carrying out substitution cleaning of the inside of the molding machine with a polyethylene terephthalate (PET) as a cleaning resin. The quantity of the polyethylene terephthalate as a cleaning resin required therefor was 280 g (14 shots) and the time required for the cleaning was 19 minutes.

EXAMPLE 7

A high density polyethylene (melt index: 0.80, Q value: 9.2, density: 0.945) (2.95 Kg), sodium dodecylbenzenesulfonate (0.90 Kg), a polyethylene wax (number average molecular weight: 1,500) (0.25 Kg) and CaCO₃ (0.90 Kg) were mixed together under the same conditions as in Example 5, followed by pelletization. Using the resulting cleaning resin composition, a clearability test was carried out in the same manner as in Example 5. The quantity of a polypropylene used as a cleaning resin was 140 g (7 shots) and the time required for the cleaning was 12 minutes.

EXAMPLE 8

A high density polyethylene (melt index: 0.08, Q value: 9.2, density: 0.945) (4.05 Kg), potassium dodecylbenzenesulfonate (0.20 Kg), MgCO₃ (0.30 Kg) and a polyethylene wax (number average molecular weight: 1,500) (0.45Kg) were mixed together under the same conditions as in Example 5, followed by pelletization. Using the resulting cleaning resin composition, a clearability test was carried out in the same manner as in Example 5. The quantity of a polypropylene used as a cleaning resin was 120 g (6 shots) and the time required for the cleaning was 11 minutes.

EXAMPLE 9

A high density polyethylene (melt index: 0.30, Q value: 6.7, density: 0.945) (3.70 Kg), magnesium dodecylbenzenesulfonate (0.45 Kg), MgCO₃ (0.65 Kg) and a polyethylene wax (number average molecular weight: 1,500) (0.20 Kg) were mixed together under the conditions as in Example 5, followed by pelletization. Using the resulting cleaning resin composition, a cleanability test was carried out in the same manner as in Example 6. The quantity of polyethylene terephthalate (PET) used as a cleaning resin was 240 g (12 shots) and the time required for the cleaning was 17 minutes.

COMPARATIVE EXAMPLE 8

A high density polyethylene (melt index: 0.70, Q value: 13.2, density: 0.945) (3.45 Kg), magnesium dodecylbenzenesulfonate (0.75 Kg), CaCO₃ (0.50 Kg) and a polyethylene wax (number average molecular weight: 1,500) (0.30 Kg) were mixed together under the same conditions as in Example 5, followed by pelletization. The resulting cleaning resin composition was subjected to a cleanability test in the same manner as in Example 5. The quantity of a polypropylene used as a cleaning resin was 440 g (22 shots) and the time required for the cleaning was 27 minutes.

COMPARATIVE EXAMPLE 9

A high density polyethlene (melt index: 2.20, Q value: 8.4, density: 0.945) (3.45 Kg), magnesium dodecylbenzenesulfonate (0.75 Kg), $CaCO_3$ (0.50 Kg) and a polyethylene wax (number average molecular weight: 1,500) (0.30 Kg) were mixed together under the same conditions as in Example 5, followed by pelletization. Using the resulting cleaning resin composition, a cleanability test was carried out in the same manner as in Example 5. The quantity of a polypropylene used as a cleaning resin was 580 g (29 shots) and the time required for the cleaning was 34 minutes.

COMPARATIVE EXAMPLE 10

A linear low density polyethylene (melt index 2.50, Q value: 13.0, density: 0.920) (2.50 Kg), sodium dodecylbenzenesulfonate (0.50 Kg), talc (2.30 Kg), sodium stearate (0.10 Kg) and zinc stearate (0.10 Kg) were mixed together under the conditions as in Example 5, followed by pelletization. Using the resulting cleaning resin composition, a cleanability test was carried out in the same manner as in Example 5. The quantity of a polypropylene used as a cleaning resin was 680 g (34 shots) and the time required for the cleaning was 39 minutes.

The compositions and the results of the cleanability tests of Examples 5-9 and Comparative examples 8-10 are collectively shown in Table 2.

it is possible to reduce the quantity of the polypropylene used, required for succeeding cleaning, down to ½ or less and it is also possible to shorten the cleaning time down to ½ to ⅓ or less.

Further, even when engineering plastics molded at high temperatures such as modified polyphenylene oxide are the preceding resin, the cleaning resin composition of the present invention exhibits a notable cleaning effect at the time of color exchange and resin exchange.

What we claim is:

1. A cleaning resin composition having 1 to 10% by weight of a polyethylene wax, 1 to 20% by weight of a neutral salt of an alkylbenzenesulfonic acid in which the alkyl group has 10 to 18 carbon atoms and 1 to 20% by weight of an inorganic filler in combination, with a high density polyethylene resin having a melt index of 1.0 or less and a Q value expressing a molecular weight distribution, of 10 or less, the total % by weight of said composition being 100.

2. A cleaning resin composition according to claim 1 comprising a melt-kneaded and molded pellet.

3. A cleaning resin composition according to claim 1 wherein said Q value is no ore than 8.

4. A cleaning resin composition according to claim 1, further including at least one of a wax, silicone, paraffin wax, or metal salt of a higher fatty acid.

5. A cleaning resin composition according to claim 1, further including at least one of polypropylene wax, carnauba wax, calcium stearate, or magnesium stearate.

6. A cleaning resin composition according to claim 1,

TABLE 2

| Item | | | | Example | | | | | Comparative example | | |
|---|---|---|---|---|---|---|---|---|---|---|---|
| | | | | 5 | 6 | 7 | 8 | 9 | 8 | 9 | 10 |
| Composition (wt. %) | PE | MI | Q | | | | | | | | |
| | HDPE | 0.30 | 6.7 | 69.0 | 85.0 | — | — | 74.0 | — | — | — |
| | HDPE | 0.80 | 9.2 | — | — | 59.0 | 81.0 | — | — | — | — |
| | HDPE | 0.70 | 13.2 | — | — | — | — | — | 69.0 | — | — |
| | HDPE | 2.20 | 8.4 | — | — | — | — | — | — | 69.0 | — |
| | LLDPE | 2.50 | 13.0 | — | — | — | — | — | — | — | 50.0 |
| | Neutral salt of alkyl-benzene sulfonic acid | | | 15.0 | 8.0 | 18.0 | 4.0 | 9.0 | 15.0 | 15.0 | 10.0 |
| | Inorganic filler | $CaCO_3$ | | 10.0 | — | 18.0 | — | — | 10.0 | 10.0 | — |
| | | $MgCO_3$ | | — | — | — | 6.0 | 13.0 | — | — | — |
| | | Talc | | — | — | — | — | — | — | — | 46.0 |
| | | Silica | | — | 4.0 | — | — | — | — | — | — |
| | Polyethylene wax | | | 6.0 | 3.0 | 5.0 | 9.0 | 4.0 | 6.0 | 6.0 | — |
| | Na stearate | | | — | — | — | — | — | — | — | 2.0 |
| | Zn stearate | | | — | — | — | — | — | — | — | 2.0 |
| Cleanability test | Test temp. (°C.) | | | 230 | 300 | 230 | 230 | 300 | 230 | 230 | 230 |
| | Preceding resin (color) | | | ABS (black) | PPO (black) | ABS (black) | ABS (black) | PPO (black) | ABS (black) | ABS (black) | ABS (black) |
| | Cleaning resin (color) | | | PP (N) | PET (N) | PP (N) | PP (N) | PET (N) | PP (N) | PP (N) | PP (N) |
| | Quantity of cleaning resin used (g) | | | 80 | 280 | 140 | 120 | 240 | 440 | 580 | 680 |
| | Cleaning time (min) | | | 9 | 19 | 12 | 11 | 17 | 27 | 34 | 39 |
| | Number of shots | | | 4 | 14 | 7 | 6 | 12 | 22 | 29 | 34 |

Note)
HDPE: high density polyethylene
LLDPE: linear low density polyethylene
N: natural color The cleaning resin compositions of the present invention exhibit a far superior cleaning effect upon cleaning of molding machines at the time of grade exchange in plastic molding processing.

By using the cleaning resin composition of the present invention, it is possible to notably reduce the quantity of the succeeding cleaning resin used and it is also possible to far shorten the time required for the cleaning, as compared with the case of using conventional cleaning resin compositions. For example, when the preceding ABS resin is exchanged with polypropylene, further including an antioxidant.

7. A cleaning resin composition according to claim 6 wherein said antioxidant is a phenolic antioxidant, thio antioxidant, or phosphorous antioxidant.

8. A cleaning resin composition according to claim 1, further including a sodium alkyl ether sulfate ester in which the alkyl group has 6 to 20 carbon atoms, sodium α-olefin sulfonate, fatty acid alkanol amide, or sulfonic acid chloride.

* * * * *